United States Patent [19]

Rizzo

[11] 4,274,194
[45] Jun. 23, 1981

[54] MACHINE FOR ASSEMBLING ELASTIC BULBS TO FRAGILE TUBULAR ELEMENTS

[76] Inventor: Olympio C. Rizzo, R.D. #Box 231, Bloomsbury, N.J. 08804

[21] Appl. No.: 937,747

[22] Filed: Aug. 29, 1978

[51] Int. Cl.$^3$ .................. B23Q 15/00; B23P 21/00
[52] U.S. Cl. .................................. 29/717; 29/235; 29/778; 29/789
[58] Field of Search ............... 29/717, 773, 777, 778, 29/789, 235

[56] References Cited

U.S. PATENT DOCUMENTS

| | | | |
|---|---|---|---|
| 2,810,249 | 10/1957 | Wysocki | 29/773 X |
| 2,853,770 | 9/1958 | Thorn et al. | 29/717 X |
| 2,987,812 | 6/1961 | Donaldson | 29/773 X |
| 3,267,567 | 8/1966 | Shields | 29/777 |

Primary Examiner—Charlie T. Moon
Attorney, Agent, or Firm—H. Hume Mathews

[57] ABSTRACT

Apparatus and method for automatically assembling elastic bulbs to fragile tubular elements, such as the bulbs and pipettes of medicine droppers, in which a bulb and a tubular element held in axial alignment in a fixture are assembled by pressure exerted on the tubular element in the direction of the longitudinal axis of the tubular element, including means for automatically inserting said bulbs and tubular elements in said fixture and aligning the same as aforesaid.

9 Claims, 9 Drawing Figures

MACHINE FOR ASSEMBLING ELASTIC BULBS TO FRAGILE TUBULAR ELEMENTS

BACKGROUND OF THE INVENTION

This invention is concerned with an apparatus for automatically assembling an elastic bulb to a fragile tubular element. Specifically, the invention relates to a machine for automatically assembling the components of a medicine dropper; namely, the rubber bulb, cap, and glass pipette.

Medicine droppers normally consist of three component parts; a rubber bulb having a flanged end, a plastic or metal cap having a central aperture through which the bulb extends, and a glass or plastic pipette stem which fits into the flanged end of the bulb. In the past, such droppers have been produced from their component parts either by completely hand assembling all parts or by a semi-automatic technique in which two component parts, i.e. cap and bulb, are machine assembled followed by hand assembly of the glass or plastic stem into the bulb.

The present invention, on the other hand, provides an apparatus for automatically assembling all component parts of a liquid dropper.

SUMMARY OF THE INVENTION

The apparatus of this invention comprises a rotating cap feed starwheel having a plurality of spaced peripheral slots which accept cap components therein; a bulb feed bowl hopper which feeds dropper bulbs to a bulb feed chute having an outlet which aligns with a cap enclosure in the starwheel, the bulb feed chute further comprising a means for sensing and individually dispensing a bulb to a cap to form a semi-assembled bulb and cap couple; a pipette feed chute conveyor assembly; and a final assembly stage comprising a rotating assembly starwheel having slots to accept said bulb and cap couple, a rotationg top pressure head assembly plate located above said assembling starwheel, said head assembly plate having a hollow compression head assembly connected with a first cam means for vertically engaging said bulb and cap couple and having a receptacle for accepting a pipette from said pipette feed chute conveyor assembly and for guiding said pipette into said bulb; and a compression rod connected with a second cam means for vertically inserting said pipette in said bulb.

DETAILED DESCRIPTION OF THE PREFERRED EMBODIMENTS

Figures 6, 9:
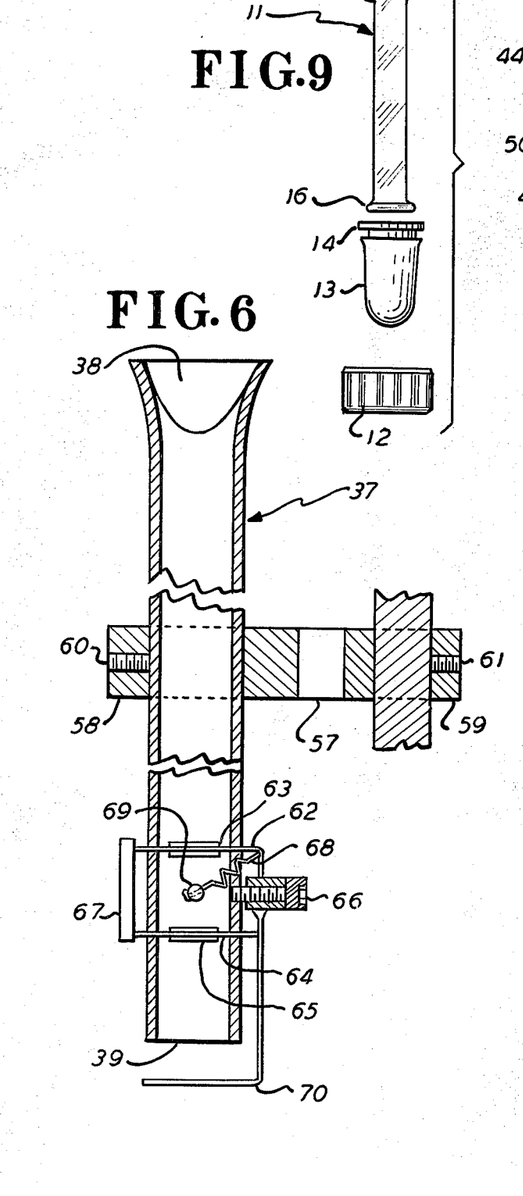
FIG. 6 is a cross-sectional view of the bulb feed chute which underlies the hopper of FIG. 5.
FIG. 9 shows an exploded view of a medicine dropper which is automatically assembled by the apparatus of this invention.

A medicine dropper of the type adapted to be assembled by the machine of this invention, as shown in FIG. 9, consists of a cap 12 made of metal or plastic having a central hollow opening (not shown) through which bulb 13 passes. The flanged end 14 of bulb 13 abuts the inside annular surface of cap 12 surrounding the opening when the bulb is fully inserted therein. The flared end 16 of glass pipette 15 is press-fitted in the flanged end 14 of bulb 13 to complete the assembly of the dropper enclosure.

Figure 1:
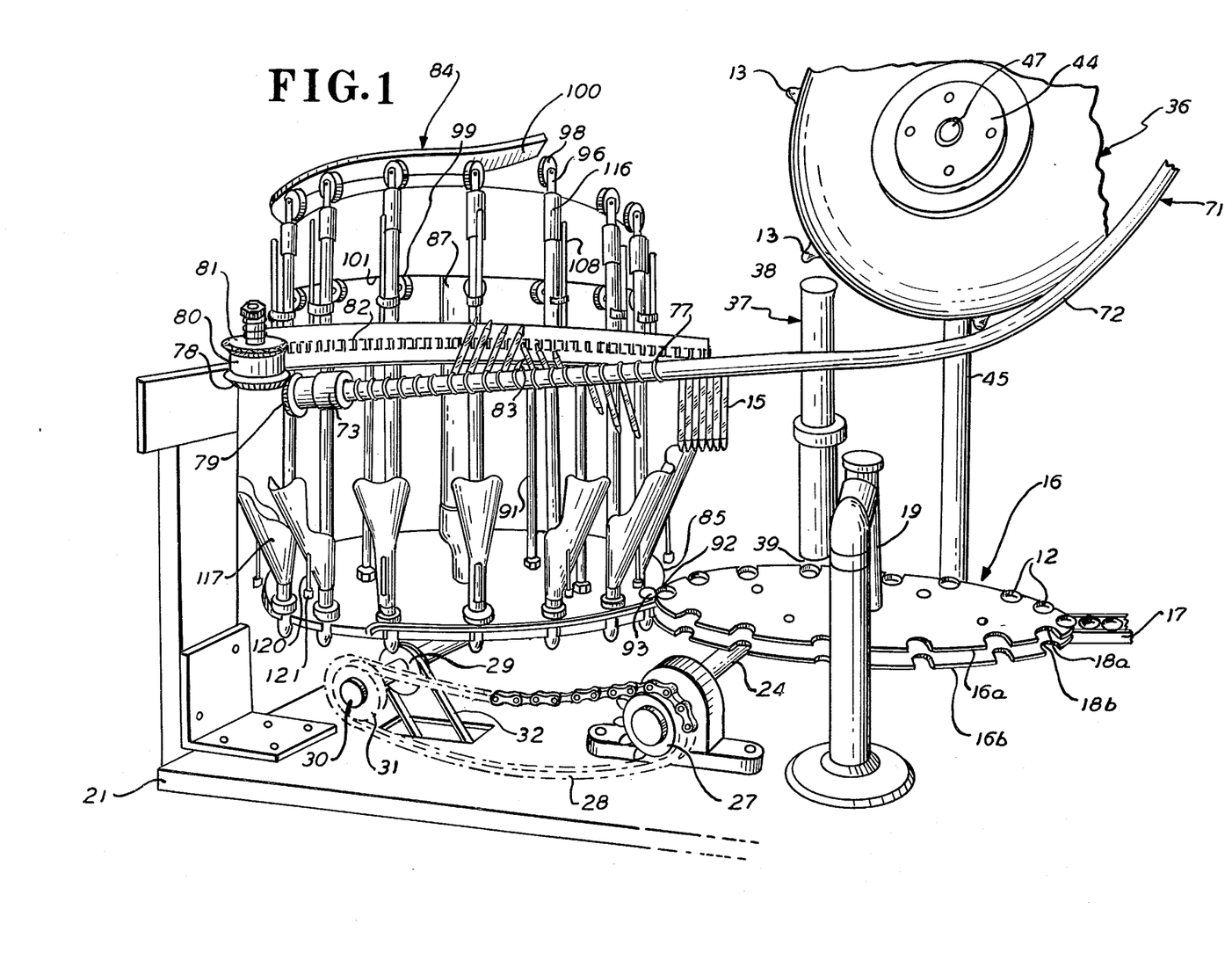
FIG. 1 is a perspective view of the apparatus of this invention.
Figure 2:
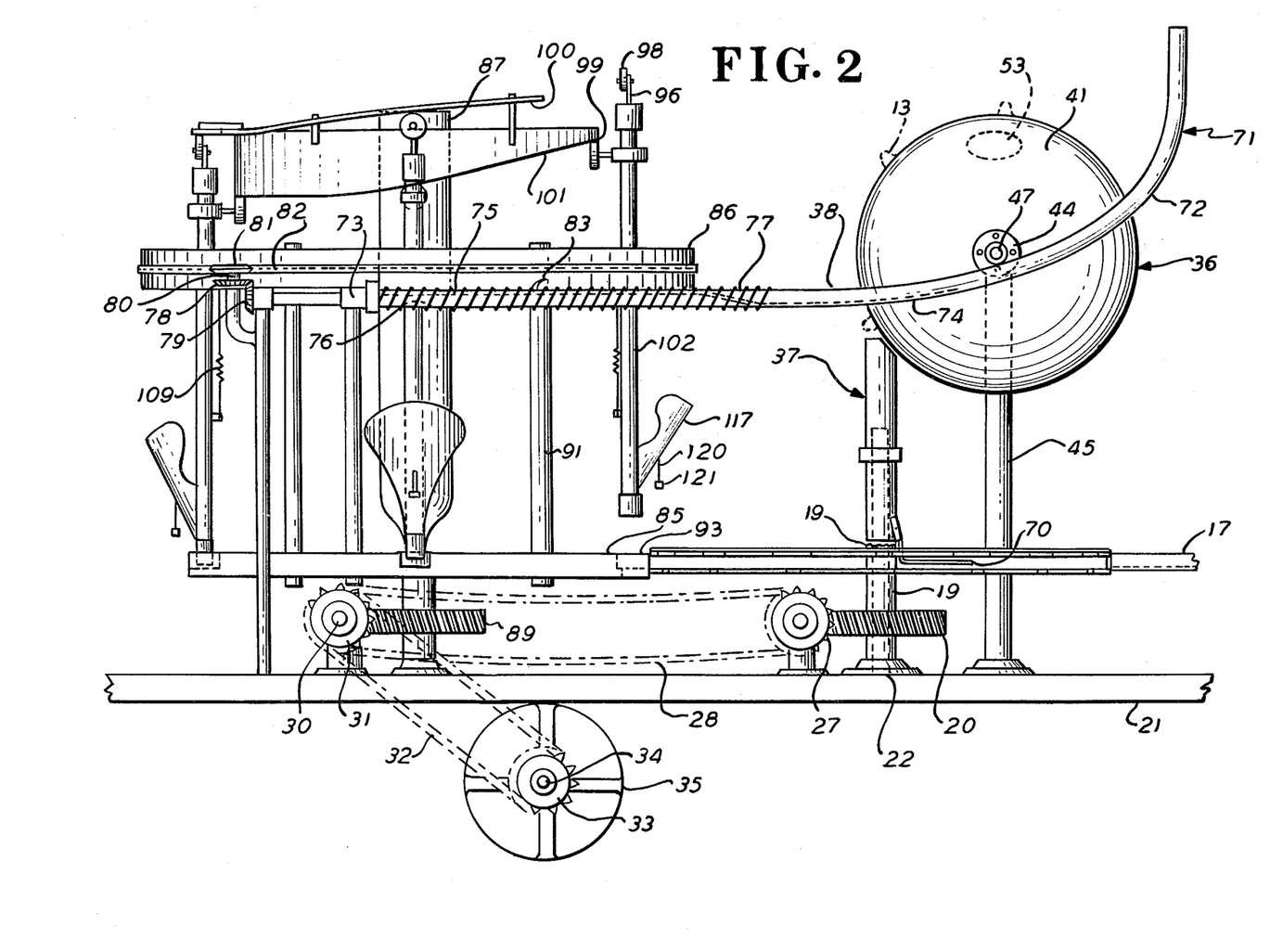
FIG. 2 is a side view of the apparatus.
Figure 3:
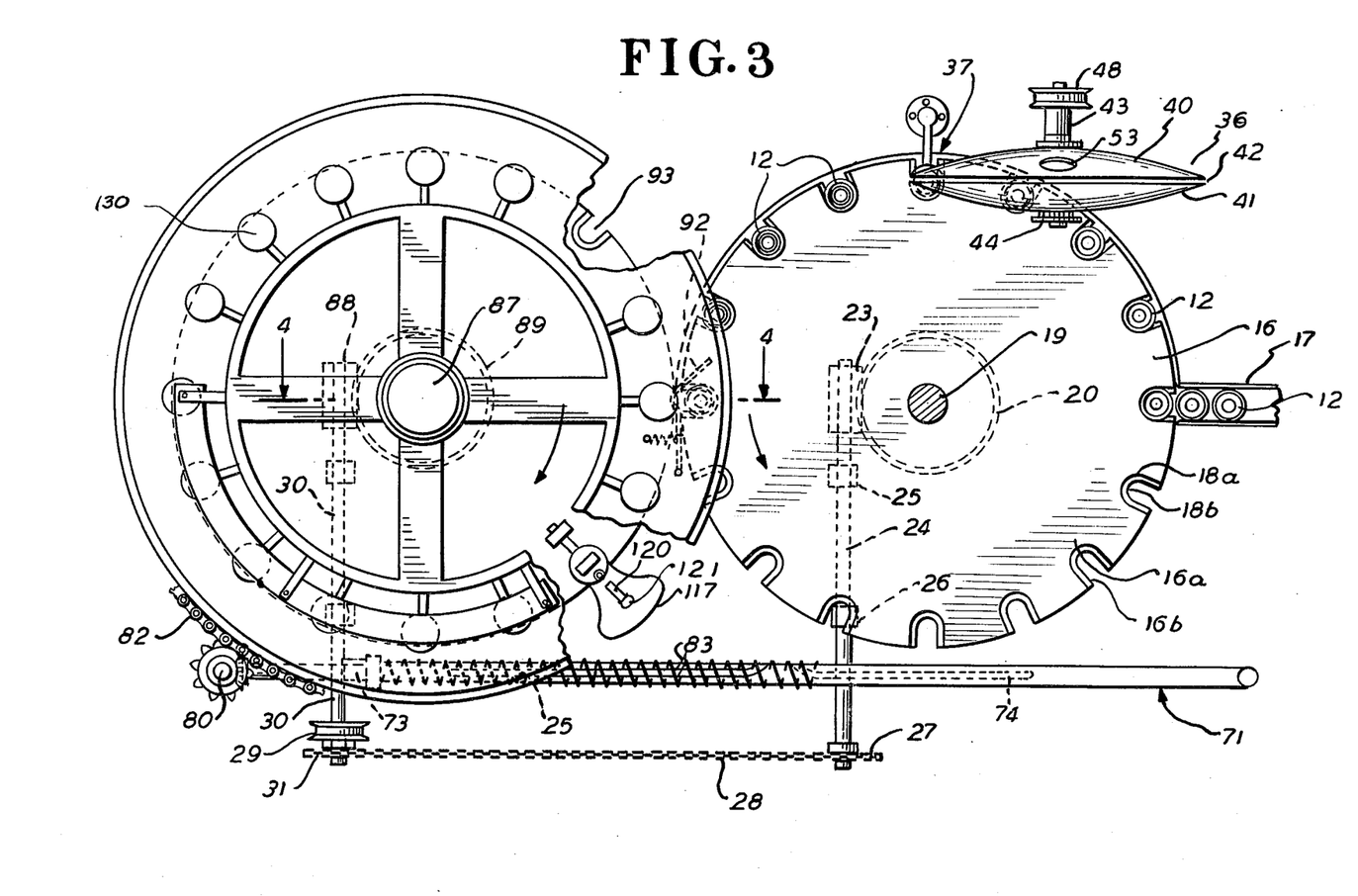
FIG. 3 is a top view of the apparatus.

FIGS. 1, 2 and 3 show a perspective, side and top view, respectively, of the apparatus of this invention for automatically assembling the component parts of the dropper as described in connection with FIG. 9. The apparatus basically comprises three component feed stages and a final assembly stage which receives all three components from the feed stages and accomplishes the final assembly.

The first component feed stage is a rotating cap feed starwheel 16 comprising two substantially identical plates 16a and 16b which starwheel accepts enclosure caps 12 from cap chute 17 one at a time with the head of each cap facing downward as shown in FIG. 9. Each cap is retained between a pair of hemispherical slots 18a and 18b which are evenly spaced around the periphery of each plate of the starwheel. Slot 18b is of slightly smaller width than slot 18a, thus forming a bottom ledge on which the cap 12 will rest. The starwheel is mounted on shaft 19 which is secured to table top 21 by means of plate 22. Fitted around the bottom of the shaft is horizontal gear 20 which meshes with starwheel drive gear 23 mounted on the end of drive shaft 24. The drive shaft 24 is supported by two journal bearings 25 and 26 and is connected to sprocket 27. Sprocket 27 is driven by outer chain drive 28 which also engages outer sprocket 31 mounted on drive shaft 30. Outer sprocket 31 mounted adjacent V-Pulley 29 on drive shaft 30 engages V-Belt drive 32 which is also engaged by V-Pulley 33 mounted on drive shaft 34. The drive shaft is coupled to a means for rotating the shaft such as electric motor 35. The rotating means is operated clockwise causing the pulleys, sprockets and drive shafts also to rotate clockwise. Drive gear 23 also rotating clockwise causes gear 20 and hence starwheel shaft 19 and starwheel 16 to rotate counterclockwise during operation of the apparatus.

The second component feed stage consists of a bulb feed bowl hopper 36 and a bulb feed chute 37. The function of the hopper is to receive a bulb supply and dispense the bulbs individually in an oriented fashion (bulb end down, flange end up) to the inlet 38 of the bulb feed chute 37. The bulb feed chute individually dispenses a bulb in the same orientation in which it is received through the chute outlet 39 to a cap 12 nested in a pair of slots in the cap feed starwheel 16 as the starwheel moves below the chute outlet. The bulb feed chute is equipped with a means for sensing the presence of a cap on the starwheel and a means connected with the sensing means for individually dispensing a single bulb to the sensed cap. If no cap is present in the starwheel, the sensing and dispensing means prevent a bulb from being dropped from the chute 37. The feed chute, sensing means and distributing means will be discussed more fully below in connection with FIGS. 6, 7 and 8.

A bulb, when dropped on the cap, fits loosely therewith in a semi-assembled state with the bulb end partially protruding through the central opening in the cap and extending downwardly through slot 18b, the edges of which form the ledge on which the caps rest.

Figure 5:
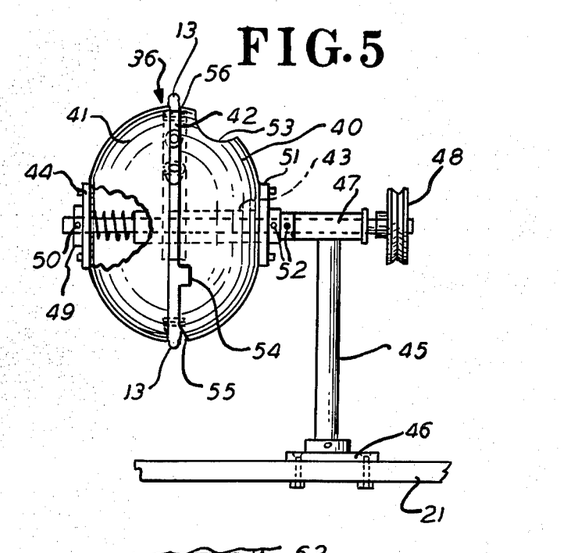
FIG. 5 is a side view of the bulb feed hopper of this invention.

Referring to FIGS. 1, 2 and 3 and particularly FIG. 5, the feed bowl hopper 36 consists of a stationary half bowl member 40 and a rotating half bowl member 41 spaced apart by gap 42 which forms a pathway for bulbs accepted by the hopper to be distributed to the bulb feed chute 37. The gap 42 is maintained by a compression spring between rotating half bowl 41 and the hollow shaft housing 43 which extends centrally from the stationary half bowl member 40 to a point inside hopper 36. The stationary half bowl member 40 is secured to the shaft housing 43 by bolted flange 51 and lock nut 52. The housing 43 is further secured to hopper stand 45 which stand is mounted on horizontal surface 21 by means of anchor flange 46. Shaft 47, rotatably mounted within housing 43, is connected at one end to drive pulley 48 and at its other end to flange 44 by means of lock nut 50. The flange 44 is bolted to rotating half bowl member 41. The drive pulley 48 accommodates a belt drive (not shown) which is further connected to a means for rotating the pulley counterclockwise (as viewed in FIG. 2), such as a motor. Rotation of the pulley 48 causes half bowl member 41 to rotate while half bowl member 40 which is connected with the housing only remains stationary. The stationary half bowl member has a loading porthole 53 for receiving a plurality of bulbs, an exit port 54 for removal of bulbs from the hopper and an oriented component slot 55 at the end for properly lining up bulbs prior to removal.

The hopper is operated by rotating the rotating half bowl member 41 counterclockwise and filling the hopper with bulbs through the loading porthole 53 which may be done automatically, The rotating half bowl member 41 agitates the rubber bulbs and causes them to fall into the oriented component slot 55. The slot 55 is designed to allow the smaller diameter of a bulb (i.e. the bulb end) to fall through the slot but retains the larger diameter (i.e. the flanged end) inside the hopper. After one or more bulbs have been oriented in the component slot 55, the rotating bowl member 41 gently presses the rubber bulbs against the stationary half bowl member and draws the bulbs around the gap 42 to the exit port 54 where the bulbs are dispensed to the bulb feed chute 37. A number of bulbs 13 are shown by the dotted lines in FIG. 5 to illustrate their orientation and path around the hopper 36. At the top portion of the stationary half bowl member 40 is a bulb guide rail slide 56 which prevents bulbs from falling back into the hopper as they reach the top portion. The slide 56 is situated a short distance below the periphery of the hopper to enable the flange portion 14 of a bulb to slide thereover on its path to exit port 54. Only those bulbs not properly oriented will fall back into the hopper.

Figure 7:
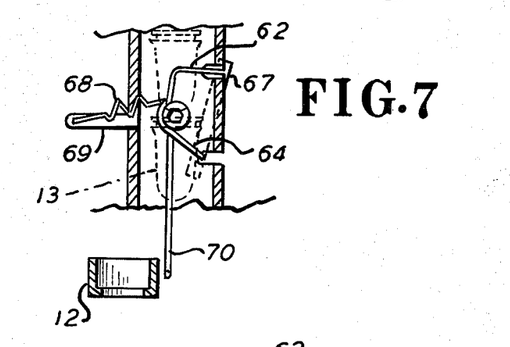
FIGS. 7 and 8 each show the operating positions of the cap sensing and bulb distributing means contained in the bulb feed chute of FIG. 6.
Figure 8:
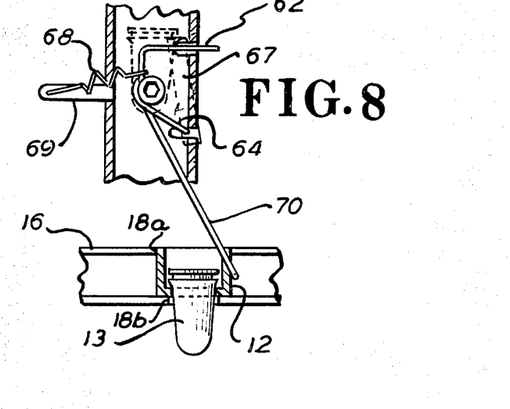

FIG. 6 shows a cross-sectional view of the bulb feed chute, and FIGS. 7 and 8 show the sensing and dispensing mechanism for bulbs in the chute. The chute, indicated generally by 37, is a tubular member having its inlet 38 machined to fit closely with the outlet 54 of bulb feed hopper 36. The chute is connected to an independent support (See FIG. 3) through a connection bar 57 which is attached at one end to the chute by locking collar 58 and at the other end to the support by locking collar 59. Adjustable set screws 60 and 61 on collars 58 and 59, respectively allow adjustment along chute 37 and the support, respectively. Near the bottom of the chute is a cap sensing and bulb dispensing means which consists of a thin wire or rod having an upper no-feed finger 62 slidably mounted in a no-feed slot 63 in the outer wall of the chute and a lower feed finger 64 slidably mounted in a feed slot 65 in the outer wall of the chute. The wire or rod is wrapped around a pivot locking nut 66 (see FIGS. 7 and 8). Mounted between the ends of the no-feed and feed finger is support arm 67. An L-shaped trigger finger 70 connected with pivot locking nut 66 is used as the means to sense the presence of a cap 12 located in the cap feed starwheel 16 directly below the outlet 39 of the chute 37. Trigger finger return spring 68 is connected at one end to trigger 70 and at the other end to extension pin 69 mounted on the outside wall of the chute.

Operation of the sensing and distributing mechanism can be understood with reference to FIGS. 7 and 8. FIGS. 7 and 8 show the mechanism rotated 90° clockwise from that shown in FIG. 6 and also show a cap moving along in the cap feed starwheel and engaging the trigger finger 70.

FIG. 7 shows the position of the sensing and distributing mechanism when no cap is sensed by the trigger 70. In such case, the feed finger 64 is pulled inwardly to the chute by spring 68 and the no-feed finger moves outwardly with respect to the chute. This causes a bulb located above the mechanism to drop down and rest on the feed finger. FIG. 8 shows the position when the trigger engages a cap 12. In this case, the feed finger 64 is moved outwardly allowing a bulb to drop from the chute while the no-feed finger 62 is moved inwardly preventing any bulbs above the mechanism from also dropping from the chute. After a bulb is dispensed, and the cap and bulb couple is moved along by the starwheel, the position of the mechanism returns to that shown in FIG. 7. The position of FIG. 7 is also attained when no cap is present in the starwheel and thus the mechanism will only dispense a bulb when a cap is present in the starwheel slots.

As previously mentioned, the bulb lays in the center opening of the cap with the bulb end down and flange end up and this loose semi-assembly is moved by the cap starwheel to the final assembly stage.

The third component feed stage consists of a pipette feed chute conveyor, shown generally by 71 in FIGS. 1, 2 and 3. The feed chute comprises a longitudinal tubular member 72 extending downwardly from a source of glass pipettes (not shown) which are fed into the inlet end of the tubular member. The discharge end of the tubular member is connected to collar 73 adjacent the final assembly stage which will be described in more detail below. The tubular member has a slot 74 which orients the pipette. This slot begins at the underside of the tubular member at a point approximately where the tube becomes horizontal and runs in curvilinear fashion 180° to the upperside of the tubular member and then to the discharge end 75 of the member above pipette exit slot 76. A feed drive conveyor spring 77 connected to collar 73 for rotation therewith encircles the tubular member from the collar to a point below the forward end of the slot 74. The slot is machined so that the smaller diameter of a glass pipet will fall through the slot while the larger diameter will be held inside the tubular member 72. FIG. 1 shows seven pipettes 15 which have been rotated to their upper positions in the slot 74. The collar 73 and hence the conveyor spring are rotated by lower horizontal drive gear 78 mounted on shaft 80 which meshes with vertical gear 79 connected to collar 73. Mounted above horizontal gear 78 on shaft 80 is upper horizontal drive sprocket 81 which is driven by chain drive 82 on the final assembly stage. As the feed drive spring 77 rotates and a pipette in the slot moves by gravity, to the spring, it is picked up by the conveyor spring and carried toward the exit slot 76 while being inverted by the change in path of the slot, as shown in FIG. 1, until it reaches the exit slot 76. The pipette then drops through exit slot 76 by gravity with its larger diameter end pointing downward. The conveyor spring 77 is also equipped with an L-shaped member 83 near that portion of the slot 74 which runs along the upper side of the tubular member 72. The L-shaped member prevents a pipette which has been rotated 180° in the slot, from leaning forward and thus exiting the chute in the wrong orientation, by pushing back the pipette so it returns to an upright position.

Figure 4:
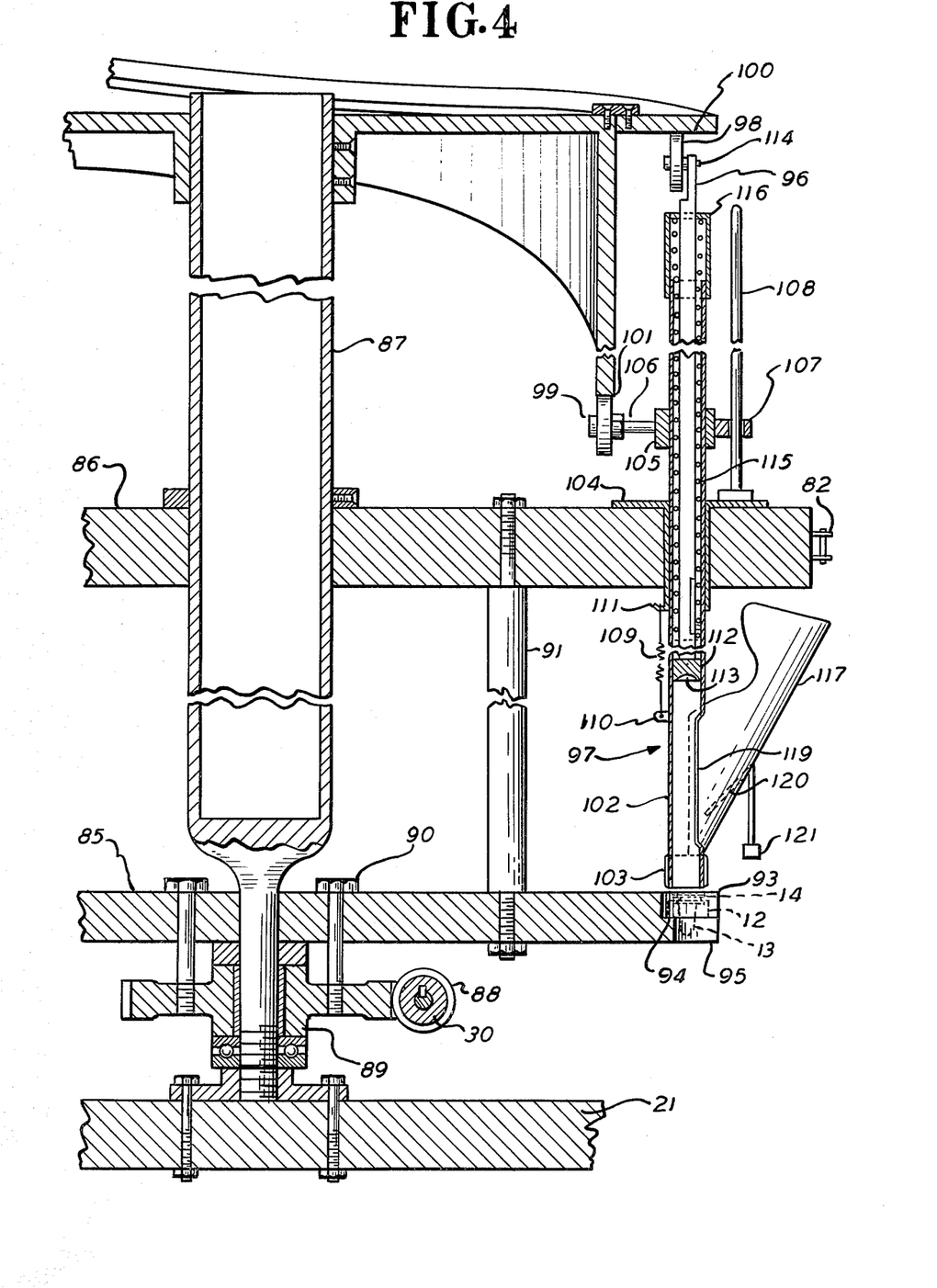
FIG. 4 is a cross-sectional view on the line 4—4 of FIG. 3 showing details of the final assembly stage.

The final assembly stage is indicated generally by 84 in FIGS. 1, 2 and 3. FIG. 4 is a cross-sectional view along line 4—4 of FIG. 3. This stage takes the semi-assembled cap and bulb from the cap starwheel 16, compresses the bulb flange 14 on the cap so that the bulb and cap are fully assembled, and then inserts a properly oriented pipette feed chute exit slot 76 into the bulb to complete the assembly.

The final assembly stage consists basically of an automatic assembling starwheel 85 and a top pressure head assembly plate 86 rotatably mounted on a common main shaft 87 secured to horizontal surface 21. The automatic assembling starwheel is rotated by a small gear 88 mounted on shaft 30 which meshes with gear 89 mounted on the lower end of main shaft 87 below starwheel 85. The gear 89 is bolted by means of bolts 90 to assembling starwheel 85. Threadably connected in the automatic assembling starwheel 85 and top pressure head assembly 86 are adjustable spacing rods 91 which connect the top pressure head assembly to the starwheel for rotation therewith, in a clockwise direction as viewed in FIG. 3.

The automatic assembling starwheel 85 is a plate-like member having a number of equally-spaced pockets 93 around the periphery which are designed to line up with the slots in the cap feed starwheel 16 at junction 92. A cap slide finger is provided to push a cap and rubber bulb assembly out of the feed starwheel and into the assembly starwheel as it rotates. Thus, a cap and bulb contained in a cap feed starwheel slot is transferred to the pocket 93 of the assembling starwheel 85. Referring to FIG. 4, the pocket has a ledge 94 and a center 95. The cap 12 rests on the ledge with the bulb 13 extending partially through the cap as shown by the dotted lines. The center 95 of the pocket 93 allows the bulb to be pressed down into the cap during final assembly and enables the final product to slide out of the assembling starwheel after assembly. Extending through cylindrical openings around the top pressure head assembly directly in line with the pockets of the assembling starwheel 85 is a vertically movable compression rod 96 housed within compression head assembly 97. The rod and head are directed and controlled in their downward vertical movements by cam followers 98 and 99, respectively which roll along a pair of cam surfaces above the top pressure head assembly plate. The compression head assembly consists of a hollow compression head housing 102 which has mounted on its lower end a compression tip 103 designed to fit the inside diameter of a cap. The housing is slidably mounted in flange bushing 104 which extends through the top pressure head assembly plate 86. Above the flange bushing 104 the housing is connected to locking collar 105. Axle pin 106 extends inwardly from collar 105 and is connected to compression head cam follower 99. Slide guide 107 is connected to the outward side of collar 105 and slidably engages guide rod 108. The slide guide and rod prevent the compression head from turning when pressure is applied to the head. Compression head return spring 109 is connected between connector 110 of the housing 102 and a lip 111 on the flange bushing 104. The compression rod 96 extends through the compression head housing 102 and has a compression rod head 112 on its lower end. The inside diameter 113 of the head is hollowed to a conical shape so that the narrow tip of a glass pipette will slide into the center of the rod head and be aligned vertically to fit inside the bulb. The upper end of compression rod 96 is connected to compression rod cam follower 98 by axial pin 114 extending through an opening in the rod to the cam follower. Surrounding the compression rod inside the housing 102 and connected thereto is compression rod return spring 115. A return spring guard 116 overlies the spring 115 at the top of the housing.

Extending from the outward side of the housing 102 above the compression tip 103 is chute catcher 117 which receives an oriented pipette 15 which drops out of exit slot 76 of the tubular feed chute 71. A chain drive 82 drives upper horizontal gear 81 on shaft 80 and also lower gear 78 which in turn drives spring conveyor 77 encircling the feed chute 71. The chain drive 82 and spring conveyor 77 are timed in relative rotation so that a pipette is dropped into a chute when the chute passes under the exit slot 76. A slot 119 in the housing 102 allows a pipette to enter the inside of the housing in an oriented position. As a pipette falls down the chute into the housing, it displaces lever arm 120 which is pivotably mounted on outside of the chute. After the pipette has entered slot 119, counter weight 121 on the outside end of the lever arm, moves the lever arm 120 inwardly to hold, move and/or hold the pipette in a vertical position in the compression head housing for insertion into the bulb.

Final assembly in the final assembly stage is accomplished according to the following: with particular reference to FIGS. 2, 3 and 4.

As the top pressure head assembly plate 86 and starwheel assembly plate 85 are rotated, compression head cam follower 99 is lowered by declining cam surface 101. This causes the compression head assembly housing to descend so that compression tip 103 presses the rubber bulb above the cap into the cap opening and holds the rubber bulb flange tightly against the inside of the cap. Next, a pipette is dropped in the chute catcher 117 and enters the housing in an oriented position (large end down). Compression rod cam follower 98 then moves downward along cam surface 100 causing compression rod 96 to descend and force pipette stem into the bulb flange thus completely assembling the medicine dropper. Compression tip 103 maintains pressure on the inside of the bulb flange thus preventing the compression rod head 112 from pushing the bulb through the cap. After assembly, both cam followers 98 and 99 move upwardly on their respective cam surfaces with cam follower 98 moving off its cam surface. Compression head return spring 109 acts to completely retract the compression head assembly high enough so that the completed assembly components can be released from the starwheel assembly plate. Compression rod return spring 115 also retracts the compression rod 96. The completely assembled dropper is removed from the assembly stage at point 130 (see FIG. 3).

The above description of the presently preferred embodiment of the invention is directed to the invention as applied to the automatic assembly of three component medicine droppers. However, as will be apparent to those skilled in the art, the machine of the present invention can be used for the automatic assembly of other articles, which consist of or include an elastic bulb which is to be assembled automatically to a fragile, such as glass or plastic, tubular element.

I claim:

1. Apparatus for automatically assembling the cap, bulb and pipette components of liquid droppers comprising, a rotatable feed wheel having a plurality of receptacles spaced circumferentially therearound, means for rotating said feed wheel, a cap feeding station for placing caps in said receptacles as the feed wheel rotates past said cap feeding station, a bulb feeding station for placing bulbs in said caps as the feed wheel rotates past said bulb feeding station, a rotatable assembly wheel positioned adjacent said feed wheel and having a plurality of assembly fixtures spaced therearound, means for transferring the respective cap and bulb assemblies from the feed wheel to the assembly fixtures on said assembly wheel, means for inserting a pipette into each said assembly fixture after a cap and bulb has been transferred thereto, and means for pressing the cap, bulb and pipette in each said assembly fixture into fully assembled relationship.

2. Apparatus according to claim 1, in which the means for pressing the three components into fully assembled relationship includes a first cam operated plunger for holding each cap and bulb assembly in fixed position while a second cam operated plunger forces the end of the pipettes into the assembled cap and bulb.

3. In an apparatus for automatically asembling flanged rigid caps with flanged elastic bulbs, the improvement which comprises, a pair of relatively rotatable half bowl members having an annular gap therebetween of a dimension slightly larger than the width of said bulbs but smaller than the diameter of the bulb flanges, means for inserting a plurality of said bulbs into the space within said half bowl members, means for rotating one of said half bowl members relative to the other half bowl member whereby the said bulbs become oriented with the main portion of each bulb extending outwardly through said annular gap while the flange portion thereof is retained within the half bowls with the flange resting on the adjacent bowl edges on opposite sides of said gap, and means for successively discharging the so oriented bulbs from the half bowl members as the bulbs are moved by the rotation of said one half bowl member into a discharge opening which allows the bulbs to drop through said gap.

4. An apparatus for individually assembling a plurality of bulbs each bulb having a bulb end and a flanged end, with a plurality of caps, each cap having a head and a central opening for receiving said bulb and therethrough comprising:

a rotatable horizontal cap feed wheel having a plurality of receptacles spaced about the periphery of said wheel, each receptacle adapted to retain a cap having its head facing downwardly;

means for feeding a plurality of caps to said cap feed receptacles;

means for rotating said cap feed wheel;

a bulb feed chute mounted above said feed wheel having an inlet and an outlet, said outlet positioned over the periphery of said cap feed wheel for individually dispensing a bulb to a cap retained in a receptacle;

a bulb feed bowl hopper for retaining and individually dispensing a plurality of bulbs to said feed chute inlet, each bulb being dispensed with its bulb end extending downward, said hopper comprising a rotatable half bowl member and a stationary half bowl member spaced apart by a gap sufficient to retain a bulb therebetween, said stationary half bowl member having an exit port positioned above said bulb feed chute inlet and an oriented component slot adjacent said exit port for orienting each of said plurality of bulbs for retention in said gap with said bulb end extending outwardly from said bowl members; and means for rotating said rotatable bowl member; whereby said bulbs oriented and retained in said gap are rotated by said rotatable bowl member to said exit port and individually dispensed to said chute inlet with said bulb end facing downward.

5. The apparatus of claim 4 wherein said bulb feed chute further comprises means for sensing the prescence or abscence of a cap on said feed wheel and means connected with said sensing means for dispensing a bulb through said chute for the condition where said sensing means senses the prescence of a cap and for retaining a bulb in said chute for the condition where said sensing means senses the absence of a cap.

6. An apparatus for automatically assembling the cap, bulb and pipette components of a liquid dropper comprising:

a primary rotating means;

a rotatable cap feed wheel having a plurality of receptacles spaced circumferentially therearound for accepting and retaining a plurality of caps;

means connected with said primary rotating means for rotating said cap feed wheel;

means for feeding a plurality of caps to said feed wheel;

a bulb feeding station for assembling oriented bulbs in said caps as said cap feed wheel rotates past said bulb feeding station, said station comprising a rotatable bulb feeding means for individually distributing a plurality of bulbs in a predetermined orientation and a bulb dispensing means associated with said bulb feeding means for dispensing said oriented bulbs to said caps;

means connected with said primary rotating means for rotating said rotatable bulb feeding means;

a rotatable assembly wheel positioned adjacent said feed wheel and having a plurality of assembly fixtures spaced therearound, means for transferring assembled caps and bulbs from said feed wheel to said assembly fixtures;

means connected with said primary rotating means for rotating said rotatable assembly wheel;

a pipette feeding conveyor means for individually dispensing a pipette in a predetermined orientation to said assembly wheel;

means connected with said primary rotating means for operating said pipette feeding conveyor means;

means for inserting a pipette into each of said assembly fixtures after a cap and bulb has been transferred thereto; and means for pressing said cap, bulb and pipette in said assembly fixture into fully assembled relationship.

7. An apparatus for automatically assembling a liquid dropper from a semi-assembled cap and bulb couple and a pipette comprising:

a pipette feed chute conveyor for individually dispensing a plurality of pipettes, each pipette dispensed with its flanged end extending downward, said conveyor comprising a longitudinal tubular member having an inlet slot for receiving and orienting individual pipettes and an outlet slot for dispensing oriented pipettes, said inlet slot extending in curvilinear fashion along said tubular member from the underside of said tubular member to the upper side of said member and to said outlet slot; said longitudinal member further comprising a rotatable conveyer spring means for moving pipettes along said inlet slot to said outlet slot; and a final assembly stage comprising rotatable assembly wheel having a plurality of pockets for accepting a semi-assembled cap and bulb couple; a vertically-movable, cam-operated hollow compression head housing having a compression tip at its lower end for completing the assembly of said bulb and cap couple, a pipette receiving slot for entry of a pipette into said housing, a vertically-movable, cam-operated compression rod operable within said compression head housing for compressing a pipette into an assembled cap and bulb; and pipette chute means communicating with said pipette receiving slot for receiving an oriented pipette from said pipette outlet slot and distributing said received pipette to said assembled cap and bulb for assembly therewith.

8. Apparatus for assembling a liquid dropper from semi-assembled elastic bulb and cap members and a tubular element comprising a fixture for holding said bulb and said tubular element in alignment, means for automatically placing said semi-assembled bulb and cap members into said fixture, means for exerting pressure of the tubular element in the direction of its longitudinal axis to force the said tubular element and said bulb into assembled relationship and means for completing the assembly of said semi-assembled cap and bulb members and maintaining the same in assembled relationship while the tubular element is forced into assembly therewith.

9. In an apparatus for automatically assembling flanged pipettes with elastic bulbs, the improvement which comprises a generally horizontally extending feed tube having a slot in the wall thereof which winds around said tube from an entrance and located in the bottom of the tube wall to a discharge end located in the top of the tube wall, means for feeding flanged pipettes into said feed tube so that each pipette drops through said slot and hangs in a vertical position below said feed tube with its flange resting inside said feed tube on the adjacent edges of said slot, a spiral member encircling said tube which when rotated relative to said tube acts successively to pick up the respective pipettes between adjacent convolutions of said spiral member and thereafter move said pipettes along said slots to the discharge end.

* * * * *